(12) United States Patent
Ono

(10) Patent No.: US 7,885,502 B2
(45) Date of Patent: Feb. 8, 2011

(54) WAVEGUIDE FILM CABLE

(75) Inventor: Tadashi Ono, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 513 days.

(21) Appl. No.: 11/996,788

(22) PCT Filed: Apr. 20, 2006

(86) PCT No.: PCT/JP2006/308348

§ 371 (c)(1),
(2), (4) Date: Jan. 25, 2008

(87) PCT Pub. No.: WO2007/013208

PCT Pub. Date: Feb. 1, 2007

(65) Prior Publication Data

US 2010/0142901 A1 Jun. 10, 2010

(30) Foreign Application Priority Data

Jul. 27, 2005 (JP) ............................. 2005-217931

(51) Int. Cl.
*G02B 6/10* (2006.01)
(52) U.S. Cl. .................. 385/132; 385/100; 385/114; 385/131; 385/130; 385/129; 385/141
(58) Field of Classification Search .................. 385/14, 385/100, 129, 130, 131, 132, 114, 141, 146, 385/147
See application file for complete search history.

(56) References Cited

U.S. PATENT DOCUMENTS

| | | | |
|---|---|---|---|
| 4,441,787 A | 4/1984 | Lichtenberger | ......... 385/128 X |
| 5,195,162 A * | 3/1993 | Sultan et al. | ................. 385/130 |
| 5,675,678 A * | 10/1997 | Neuberger et al. | ............. 385/31 |
| 7,162,134 B2 * | 1/2007 | Yamaguchi et al. | ......... 385/130 |
| 7,174,057 B2 * | 2/2007 | Shimizu et al. | ................. 385/1 |
| 7,496,266 B2 * | 2/2009 | Enami et al. | ................. 385/130 |
| 2005/0002631 A1 * | 1/2005 | Yamaguchi et al. | ......... 385/130 |
| 2009/0067799 A1 * | 3/2009 | Nakane | ....................... 385/131 |
| 2009/0196562 A1 * | 8/2009 | Ishida et al. | ................. 385/130 |
| 2009/0232465 A1 * | 9/2009 | Ono | ............................ 385/132 |
| 2010/0142901 A1 * | 6/2010 | Ono | ............................ 385/100 |

FOREIGN PATENT DOCUMENTS

| | | |
|---|---|---|
| CN | 1424597 A | 6/2003 |
| CN | 1508219 A | 6/2004 |
| EP | 1 085 351 A2 | 3/2001 |
| EP | 1 760 502 A1 | 3/2007 |
| JP | 05-281428 | 10/1993 |
| JP | 2003-095706 | 4/2003 |
| JP | 2005-008448 | 1/2005 |
| JP | 2005-156882 | 6/2005 |
| JP | 2005-173043 | 6/2005 |

OTHER PUBLICATIONS

European Search Report: PCT/JP200608348.

* cited by examiner

*Primary Examiner*—Brian M Healy
(74) *Attorney, Agent, or Firm*—Ladas & Parry LLP

(57) ABSTRACT

A disclosed waveguide film cable includes a waveguide formed on a film. The waveguide film cable includes a coating film made of a material having a Young's modulus smaller than or equal to the Young's modulus of a material that forms the film and/or the waveguide and coats partially or entirely the film and/or the waveguide.

5 Claims, 13 Drawing Sheets

FIG.3
(A)
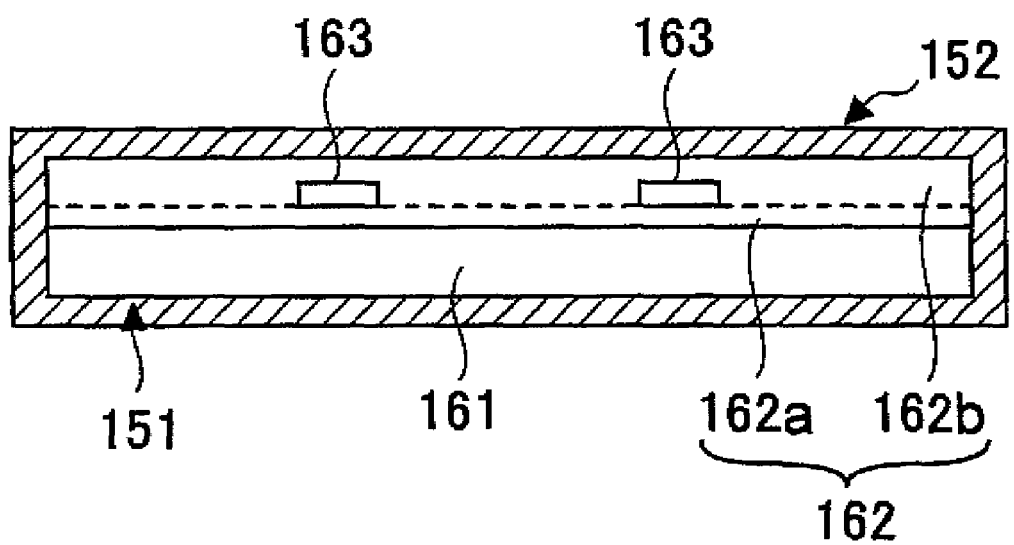
(B)
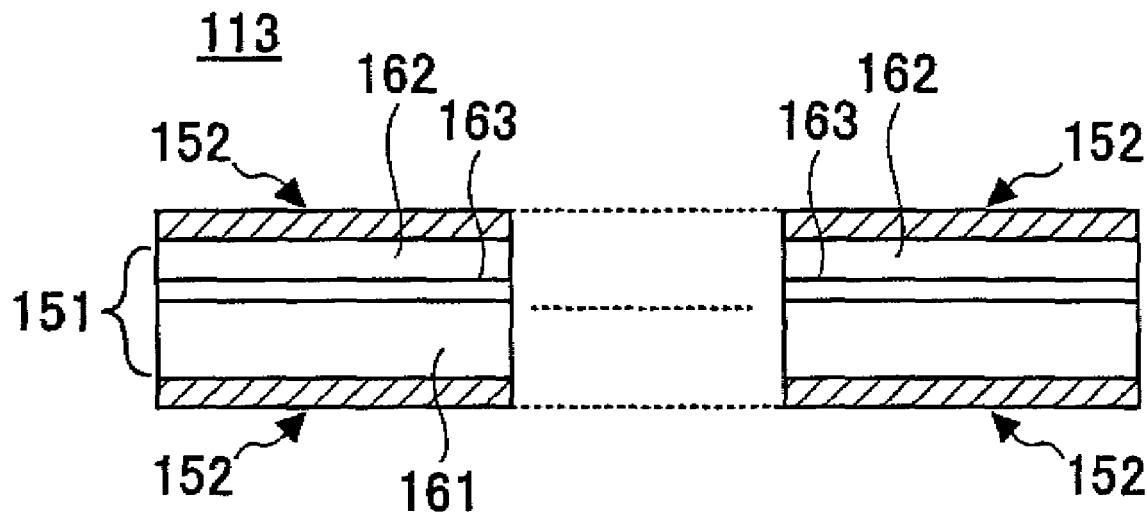

FIG.5
(A)
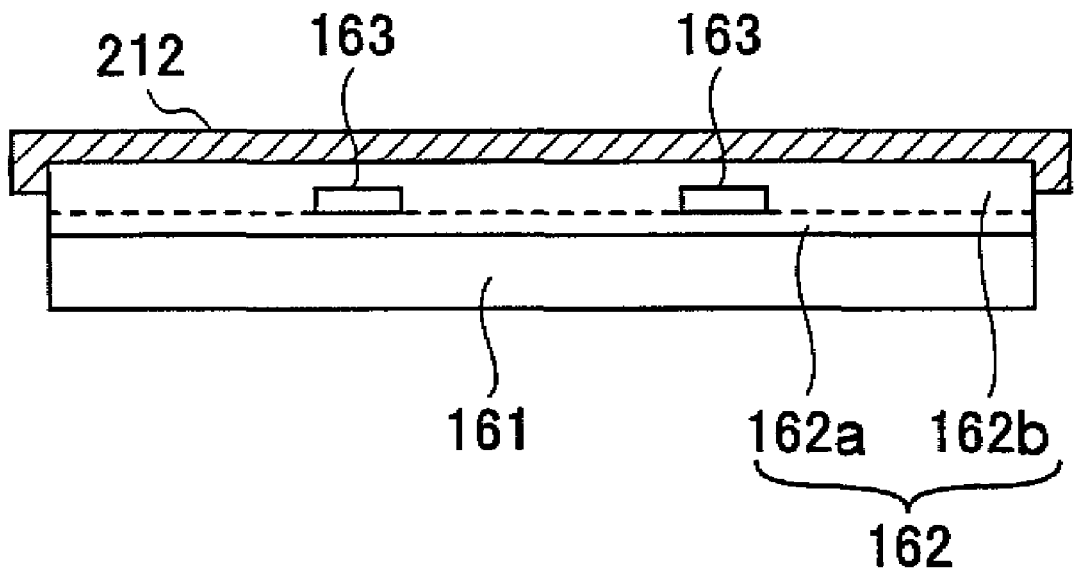
(B)
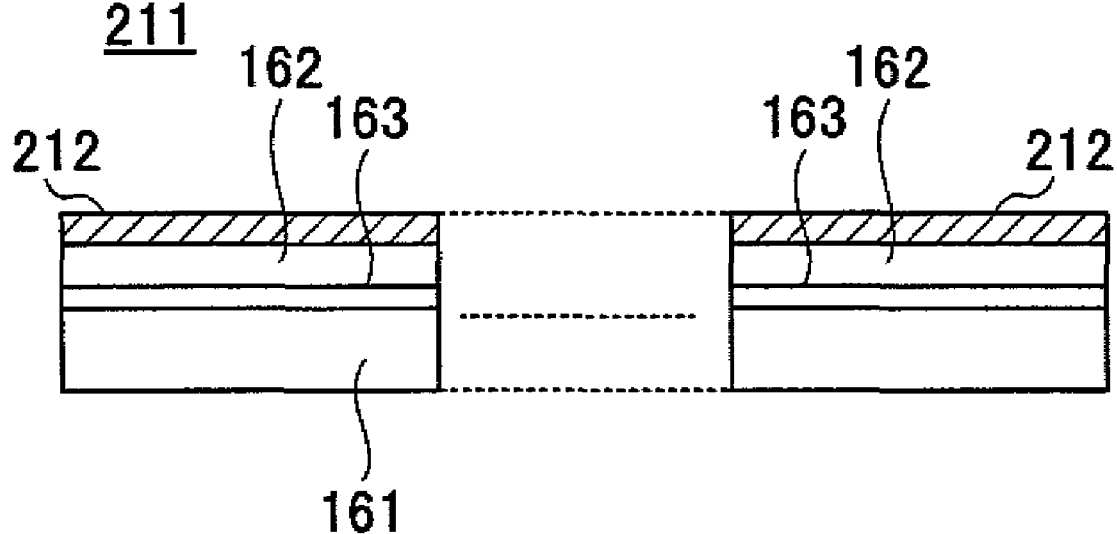

FIG.7
(A)
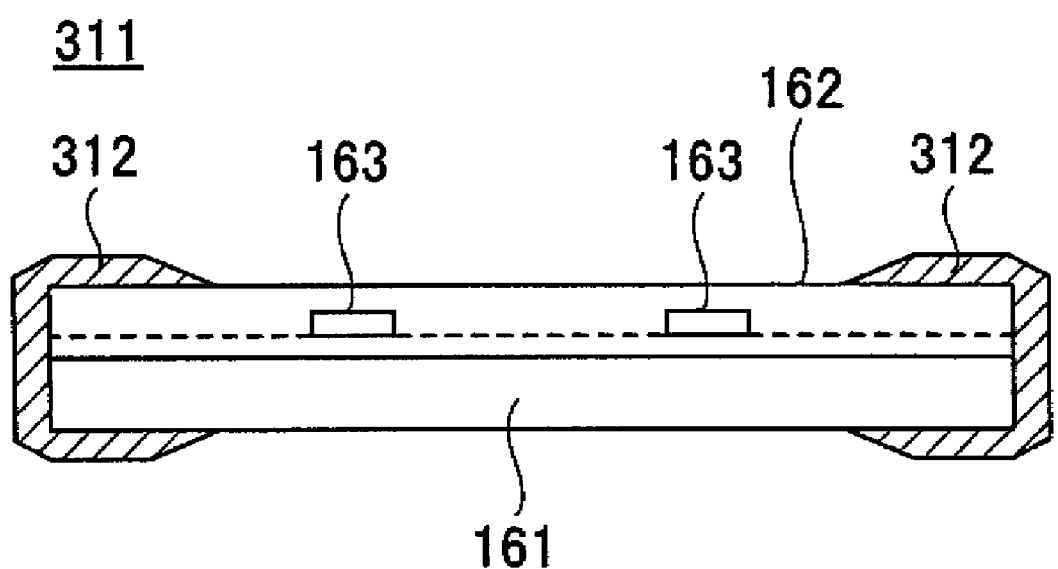
(B)
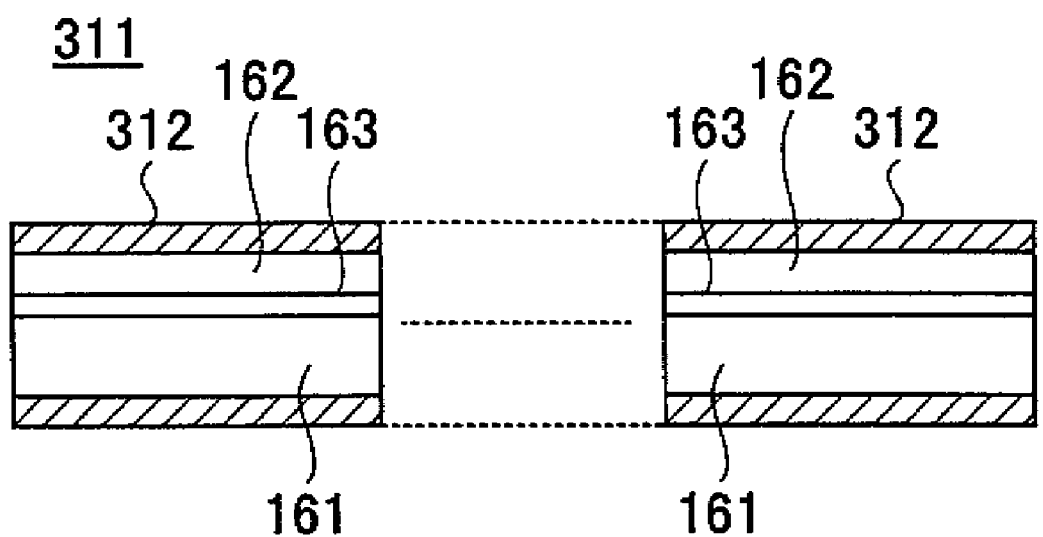

FIG.9
(A)
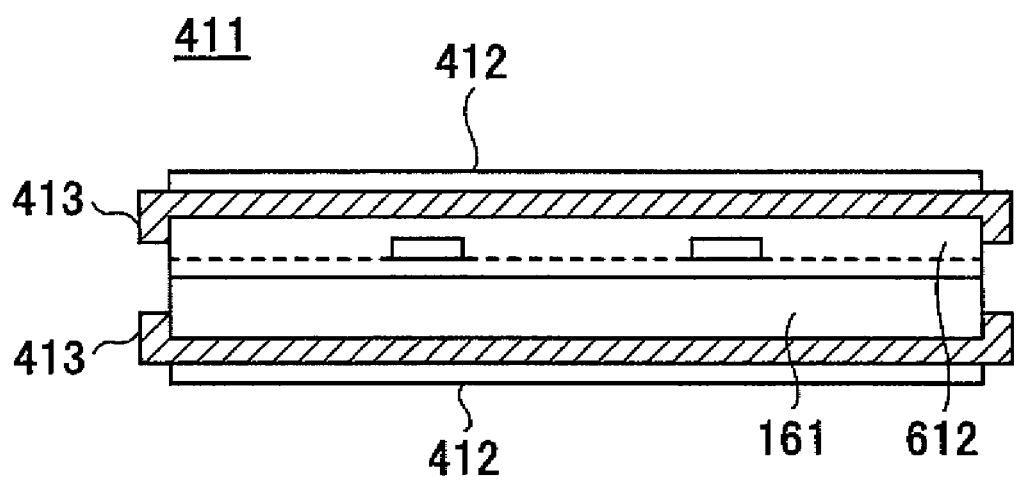
(B)
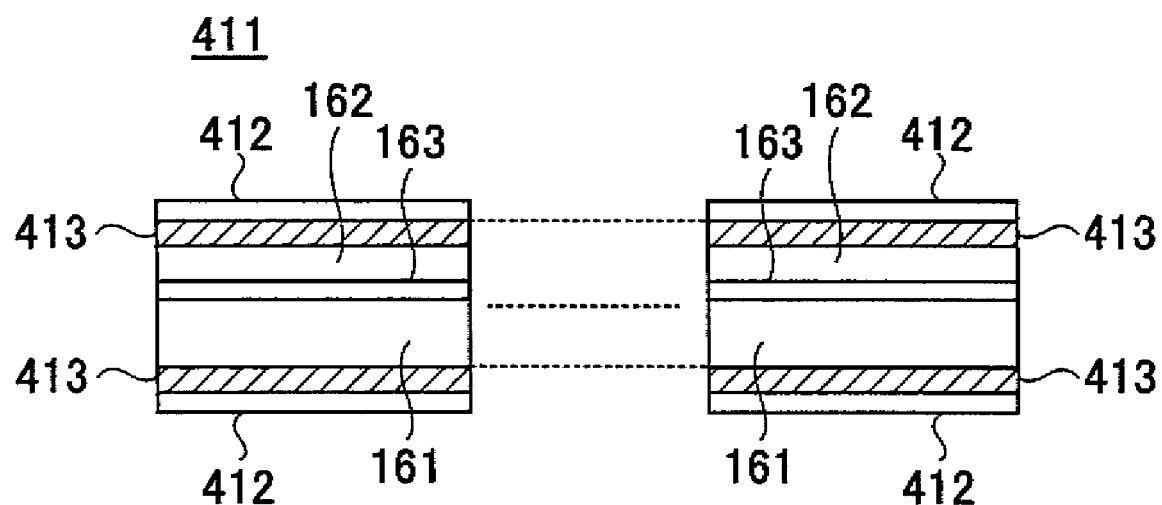

FIG.11
(A)
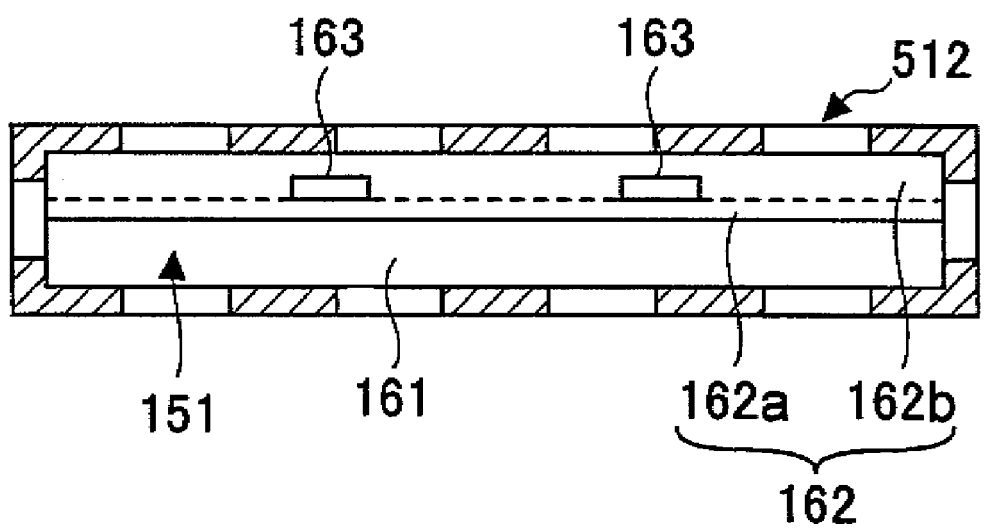
(B)
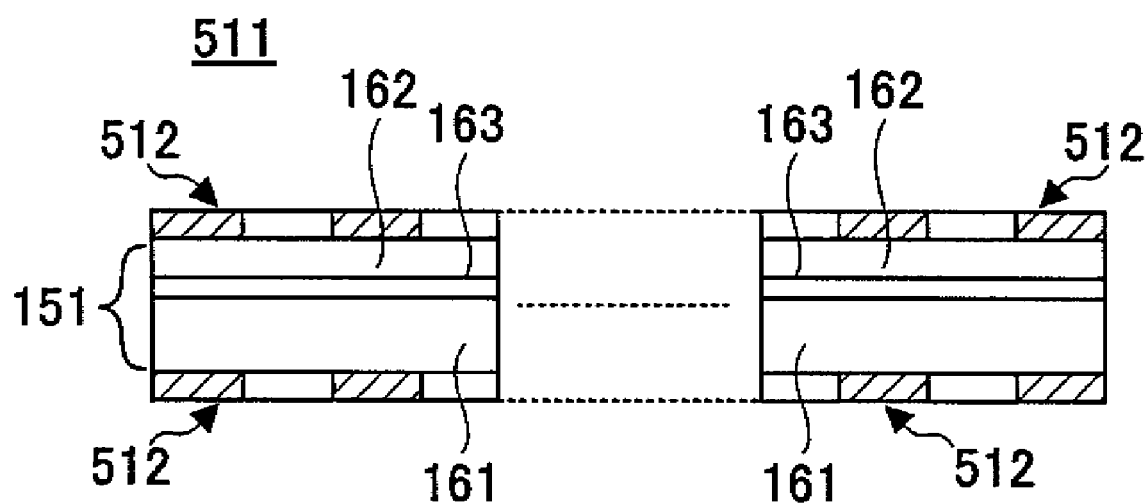

WAVEGUIDE FILM CABLE

TECHNICAL FIELD

The present invention relates to a waveguide film cable, specifically to a waveguide film cable that includes a waveguide formed on a film.

BACKGROUND ART

With a recent advancement of optical fiber networks, optical fiber is being introduced into residences. Light from the optical fiber is supplied to an optical module or an optical interconnection board, and then branched so as to be supplied into appliances having an optical input.

The optical module or the optical interconnection board having an optical circuit, a photo-detector, and a light emitting device are optically coupled by a waveguide film cable that enables optical interconnection.

In order to enhance degrees of freedom in arrangement of the optical modules or the optical interconnect boards, enhanced degrees of freedom in bending the waveguide film cable have been desired. However, since a waveguide composed of a clad and a core is formed in the waveguide film cable, when microscopic abrasion is caused, optical properties are impaired. In addition, when the waveguide film cable is broken, the waveguide is severed. Therefore, reduced microscopic abrasion and improved flex resistance are desired.

The present invention has been made in view of the above, and is directed to a waveguide film cable that can prevent or reduce microscopic abrasion and improve flex resistance.

DISCLOSURE OF THE INVENTION

According to an aspect of the present invention, there is provided a waveguide film cable configured to include a waveguide formed on a film, the waveguide film cable including a coating film made of a material having a Young's modulus smaller than or equal to the Young's modulus of a material that forms the film and/or the waveguide and coats partially or entirely the film and/or the waveguide.

The Young's modulus may be $1.0 \times 10^4$ through $9.0 \times 10^9$ dynes/cm$^2$.

The coating film may be firmly attached to the film and/or the waveguide.

The coating film may be formed on a waveguide-formed surface and/or a waveguide-unformed surface and/or aside surface of the film and/or the waveguide.

The coating film may have a thickness of 1 through 500 μm.

According to the present invention, microscopic abrasion can be prevented or reduced, and flex resistance can be improved by the coating film.

BRIEF DESCRIPTION OF THE DRAWINGS

FIG. 3 is a cross-sectional view of the waveguide film;

FIG. 5 is a cross-sectional view of the waveguide film cable according to the first modification example;

FIG. 7 is a cross-sectional view of the waveguide film cable according to the second modification example;

FIG. 9 is a cross-sectional view of the waveguide film cable according to the third modification example;

FIG. 11 is a cross-sectional view of the waveguide film cable according to the fourth modification example;

Figure 1:
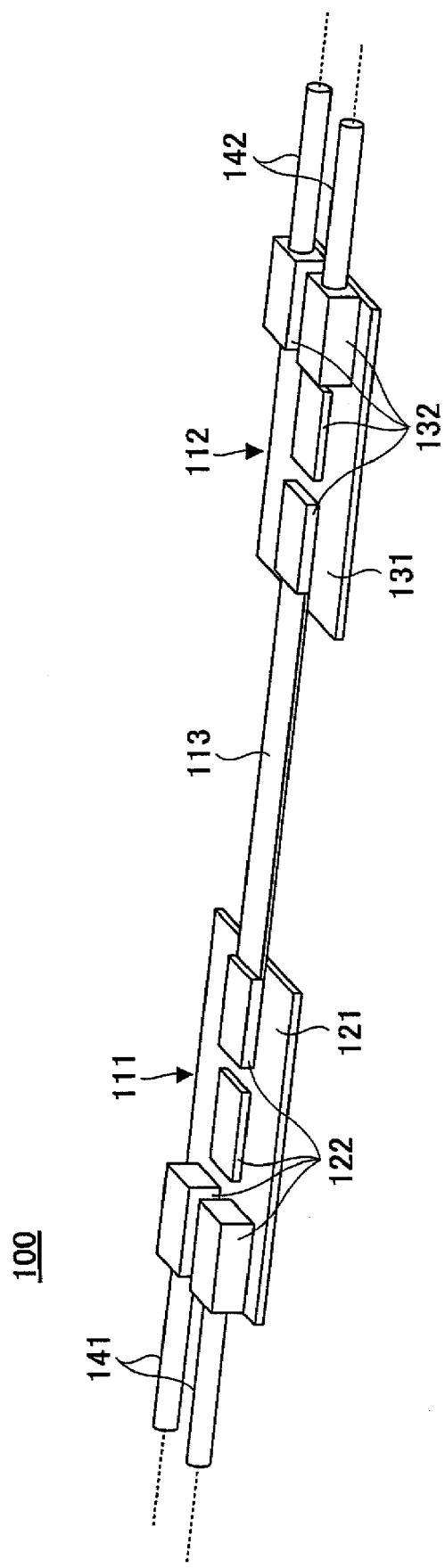
FIG. 1 is a schematic diagram of one example of the present invention.

LIST OF SYMBOLS 100 optical circuit system
111, 112 optical module
113 waveguide film cable
121, 131 printed wiring board
122, 132 electronic element
141, 142 optical fiber
151 cable body
152 coating film
161 resin film
162 clad
163 core
162a bottom clad layer
162b top clad layer

BEST MODE FOR CARRYING OUT THE INVENTION

[Configuration Outline]

FIG. 1 shows a schematic diagram of one example of the present invention.

An optical circuit system 100 according to this example includes optical modules 111, 112 and a waveguide film cable 113.

The optical module 111 is configured so as to mount electronic elements 122 on a printed wiring board 121. Optical fibers 141 and the waveguide film cable 113 are connected to the optical module 111. In addition, the optical module 112 is configured so as to mount electronic elements 132 on the printed wiring board 131. Optical fibers 142 and the waveguide film cable 113 are connected to the optical module 112.

The waveguide film cable 113 serves as an optical transmission pathway through which light travels to-and-fro between the optical module 111 and the optical module 112.

[Waveguide Film Cable]

Figure 2:
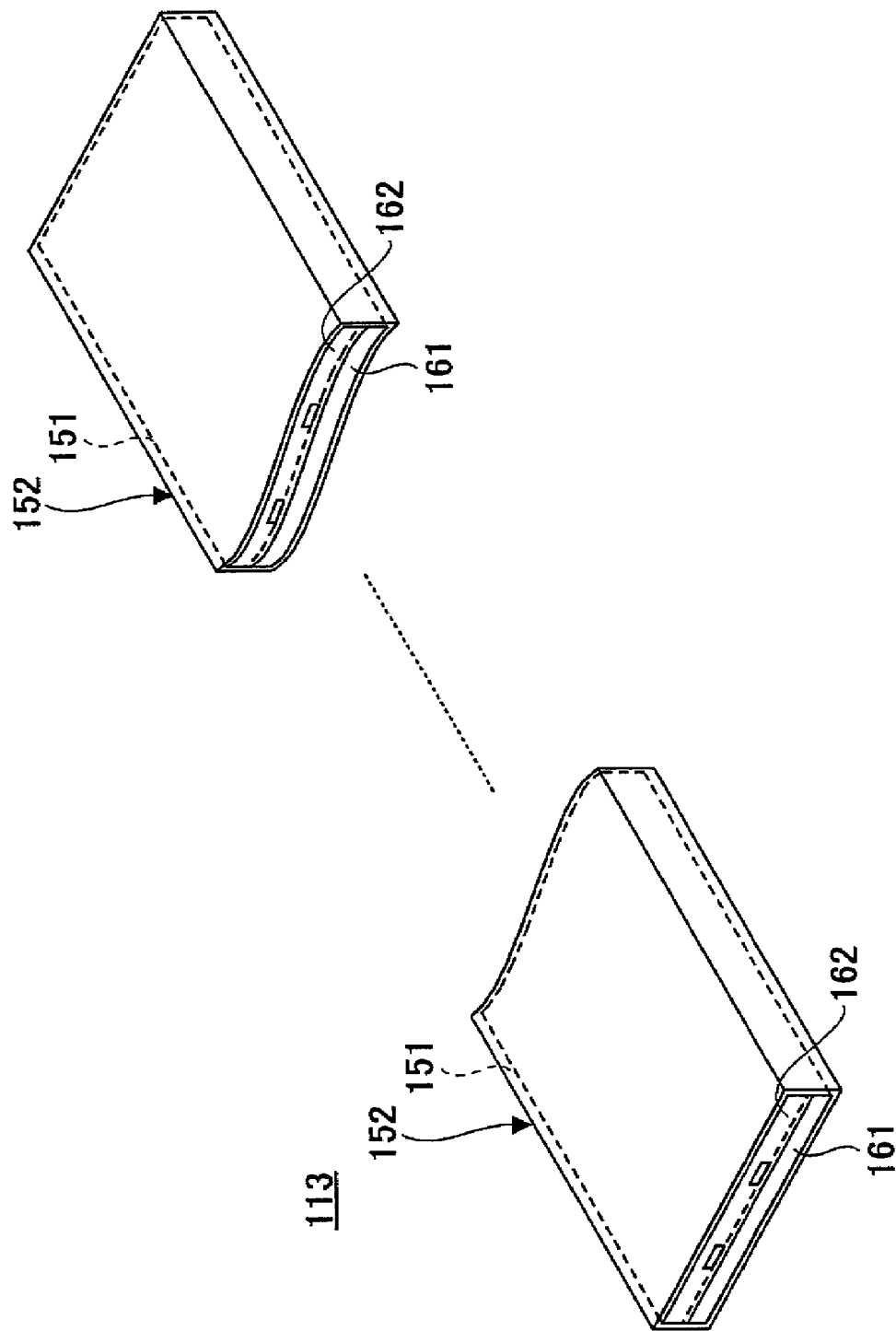
FIG. 2 is a perspective view of a waveguide film cable.

FIG. 2 shows a perspective view of the waveguide film cable 113. FIG. 3 shows a cross-sectional view of the waveguide film cable 113. Specifically, FIG. 3(A) shows a transverse cross-sectional view and FIG. 3(B) shows a longitudinal cross-sectional view.

The waveguide film cable 113 includes a cable body 151 and a coating film 152.

[Cable Body 151]

The cable body 151 is configured by forming a clad 162 and cores 163 on a resin film 161. The resin film 161 is made of, for example, a silicone resin film about 80 μm thick.

The clad 162 is composed of a bottom clad layer 162a and a top clad layer 162b.

First, the bottom clad layer 162a is formed on the resin film 161. The bottom clad layer 162a is made of, for example, a transparent resin such as polyimide.

Next, the cores 163 are formed on the bottom clad layer 162a. The cores 163 serve as a waveguide and are made of polyimide or the like, which is the same material that forms the bottom clad layer 162a.

In addition, resin constituents of the cores 163 are adjusted so that the cores 163 are different from the bottom clad layer 162a in terms of refractive index. For example, the resin constituents are adjusted so as to satisfy n1<n2, where n1 represents the refractive index of the bottom clad layer 162a and n2 represents the refractive index of the core 163. The refractive indices n1 and n2 may be 1.525 and 1.531, respectively.

The cores 163 are formed in the following manner. First, a polyamide acid layer is formed on the bottom clad layer 162a by a spin-coating method, and imidized by heat so as to be a transparent resin layer. Next, a resist film is formed and patterned on the resin layer, which in turn is etched by, for example, a reactive ion etching (RIE) method until the bottom clad layer 162a is exposed. Here, the photoresist is not etched, so that the transparent resin layer below the photoresist remains unetched. Then, the remaining photoresist is removed. Thus, the cores 163 are formed. By the way, the cores 163 have a thickness of about 9-10 μm, which is substantially the same as the diameter of an optical fiber.

The top clad layer 162b is formed so as to cover the side walls and the top surfaces of the cores 163. The top clad layer 162b is made of polyimide or the like, which is the same material that forms the bottom clad layer 162a. The resin constituents are adjusted so that the top clad layer 162b has the same refractive index n1 as the bottom clad layer 162a. The top clad layer 162b is formed in such a manner that a polyamide acid layer is formed by the spin-coating method and undergoes a heating process so as to be imidized.

Due to the above, the core 163 having the refractive index n2 is formed so as to be surrounded by the clad 162 having the refractive index n1 on the resin film 161.

[Coating Film 152]

The coating film 152 is formed so as to entirely cover the cable body 151 and has a thickness of about 1-5000 μm. The coating film 152 is made of, for example, polyimide, acrylic, polysiloxane, silicone resin, and the like, which may form the clad 162 and the cores 163, and has a relatively low Young's modulus of $1.0 \times 10^4$ through $9.0 \times 10^9$ dynes/cm$^2$ by adjusting the constituents.

The coating film 152 is formed in such a manner that uncured resin material is coated on a waveguide-formed surface, which is an upper surface, a waveguide-unformed surface, which is a lower surface, and side surfaces of the cable body 151, and cured through an addition or condensation reaction. With this, the coating film 152 is firmly attached on the cable body 151.

Since the coating film 152 is formed of a material having a relatively low Young's modulus, the coating film 152 has a high adhesiveness to the cable body 151, and the load moment can be distributed, thereby improving flex resistance. Since the coating film 152 can distribute stress applied to the cable body 151, concentration of force applied to the clad 162 and the cores 163 is prevented, thereby reducing occurrence of cracks in the clad 162 and the cores 163.

[Advantages]

As stated above, according to this example, microscopic abrasion can be prevented or reduced and flex resistance can be improved.

First Modification Example

Figure 4:
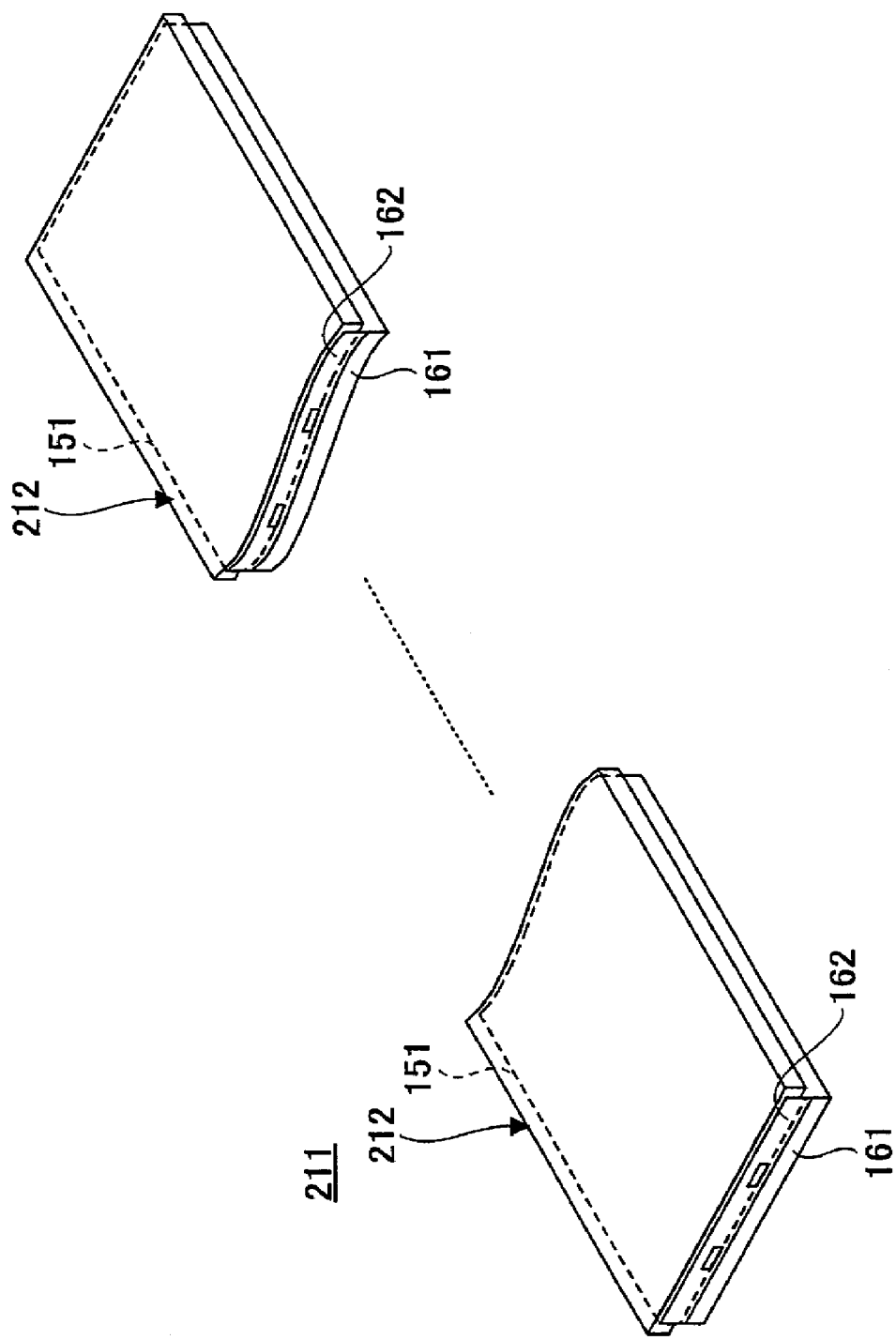
FIG. 4 is a perspective view of a waveguide film cable according to a first modification example.

FIG. 4 is a perspective view of a waveguide film cable according to a first modification example. FIG. 5 is a cross-sectional view of the waveguide film cable according to the first modification example.

A waveguide film cable 211 according to this modification example is configured so as to include a coating film 212 only on the waveguide-formed surface of the cable body 151.

The coating film 212 formed on the waveguide-formed surface of the cable body 151 is especially effective in the flex resistance when the cable body 151 is bent so that the waveguide-formed surface makes an inner circumference.

By the way, while the coating film 212 is formed on the waveguide-formed surface (the upper surface), the coating film 212 may be formed on the waveguide-unformed surface. The coating film 212 formed on the waveguide-unformed surface is especially effective in the flex resistance when the cable body 151 is bent so that the waveguide-unformed surface makes an inner circumference.

Second Modification Example

Figure 6:
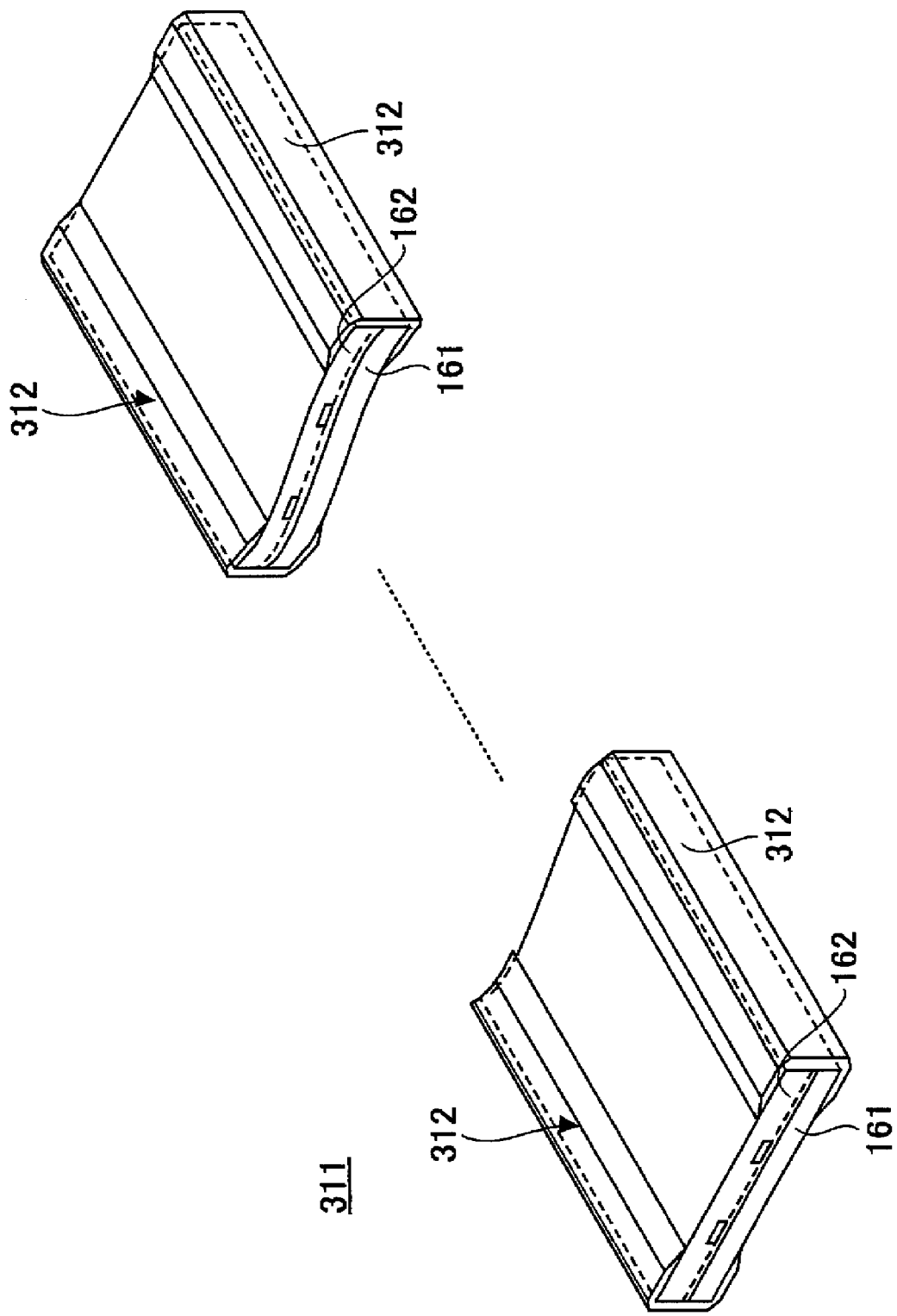
FIG. 6 is a perspective view of a waveguide film cable according to a second modification example.

FIG. 6 is a perspective view of a waveguide film cable according to a second modification example. FIG. 7 is a cross-sectional view of the waveguide film cable according to the second modification example.

A waveguide film cable 311 according to this modification example is configured so that a coating film 312 is formed on both side surfaces of the cable body 151.

The coating film 312 is formed by, for example, a dipping method or a stamping method. With this, the coating film 312 is formed on the waveguide-formed surface, a top peripheral portion, the waveguide-unformed surface, and a bottom peripheral portion of the cable body 151. This can alleviate stress applied to the edge faces and the peripheral portions where cracks may be easily caused.

In addition, compared to when the coating film is entirely formed on the waveguide-formed surface, optical degradation can be reduced.

Third Modification Example

Figure 8:
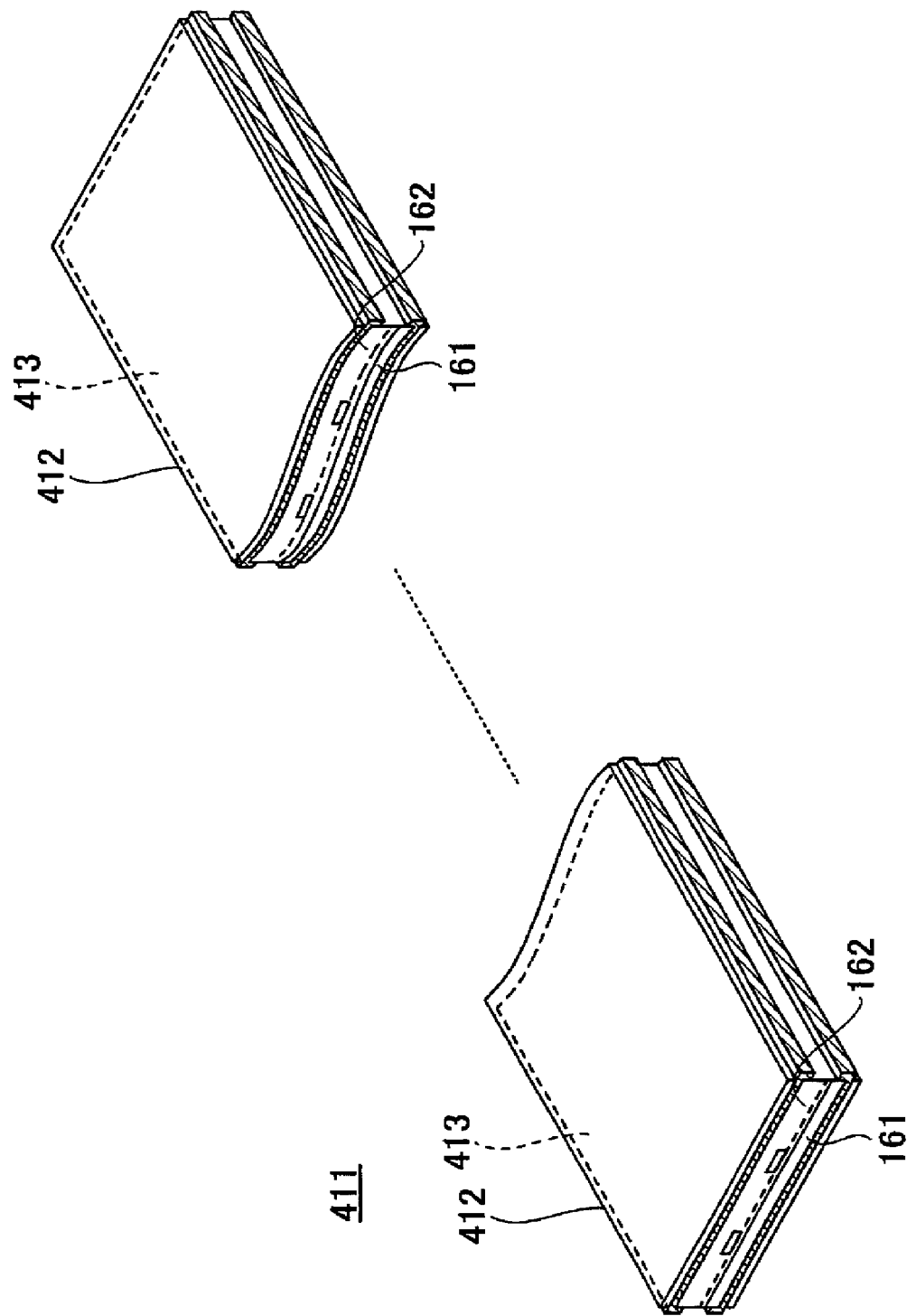
FIG. 8 is a perspective view of a waveguide film cable according to a third modification example.

FIG. 8 is a perspective view of a waveguide film cable according to a third modification example. FIG. 9 is a cross-sectional view of the waveguide film cable according to the third modification example.

A waveguide film cable 411 is configured so as to include a cover 412 that covers the cable body 151, and a coating film 413 between the cable body 151 and the cover 412. The coating film 413 can absorb stress caused between the cover 412 and the cable body 151.

Fourth Modification Example

Figure 10:
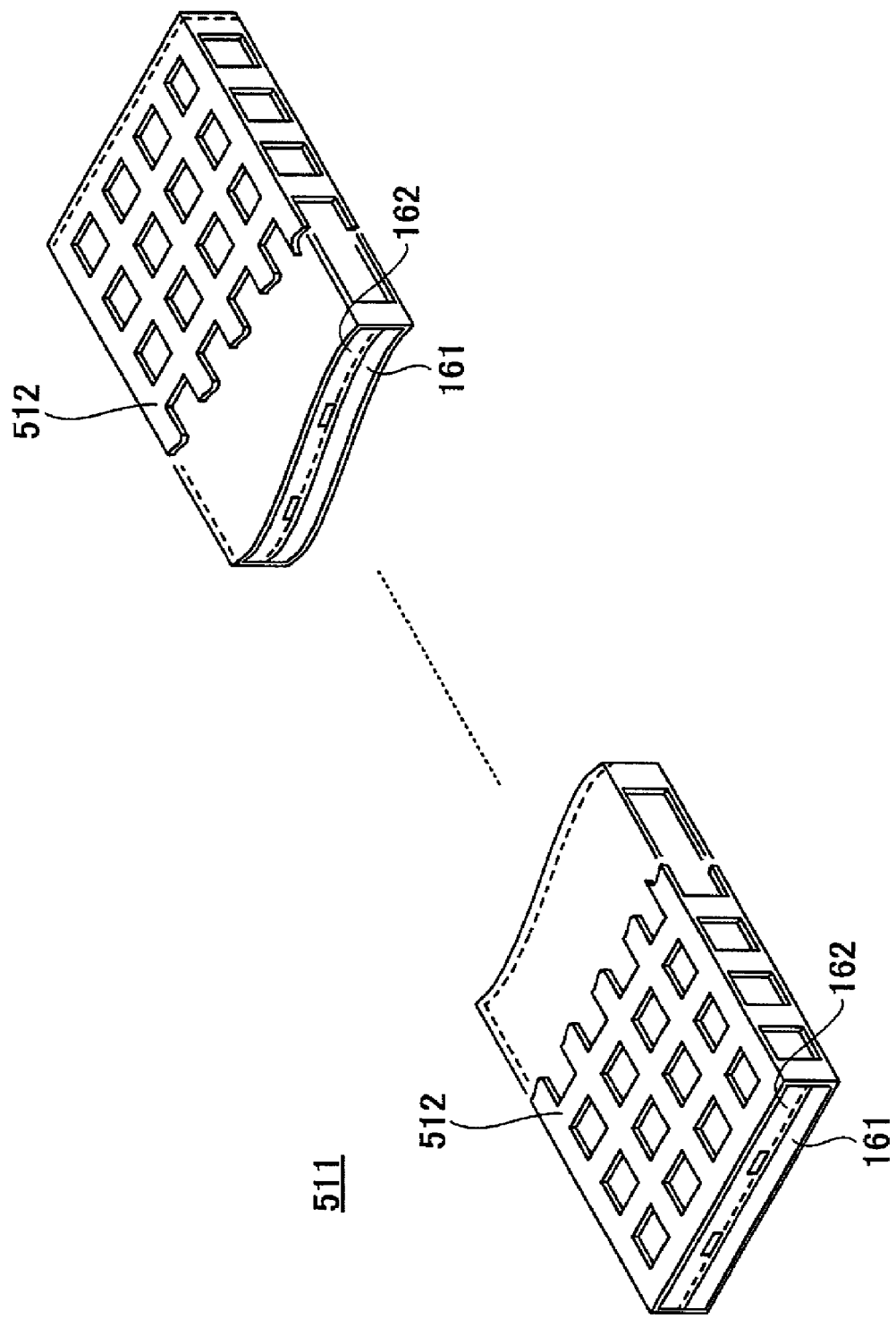
FIG. 10 is a perspective view of a waveguide film cable according to a fourth modification example.

FIG. 10 is a perspective view of a waveguide film cable according to a fourth modification example. FIG. 11 is a cross-sectional view of the waveguide film cable according to the fourth modification example.

A waveguide film cable 511 is configured so as to include a grid-shaped coating film 512 on the cable body 151. The coating film 512 can reduce optical degradation, compared to when the coating film is entirely formed on the waveguide-formed surface.

By the way, while the coating film 512 is grid-patterned in this modification example, the pattern is not limited to the grid but may be variously arranged.

Validation Example

Figure 12:
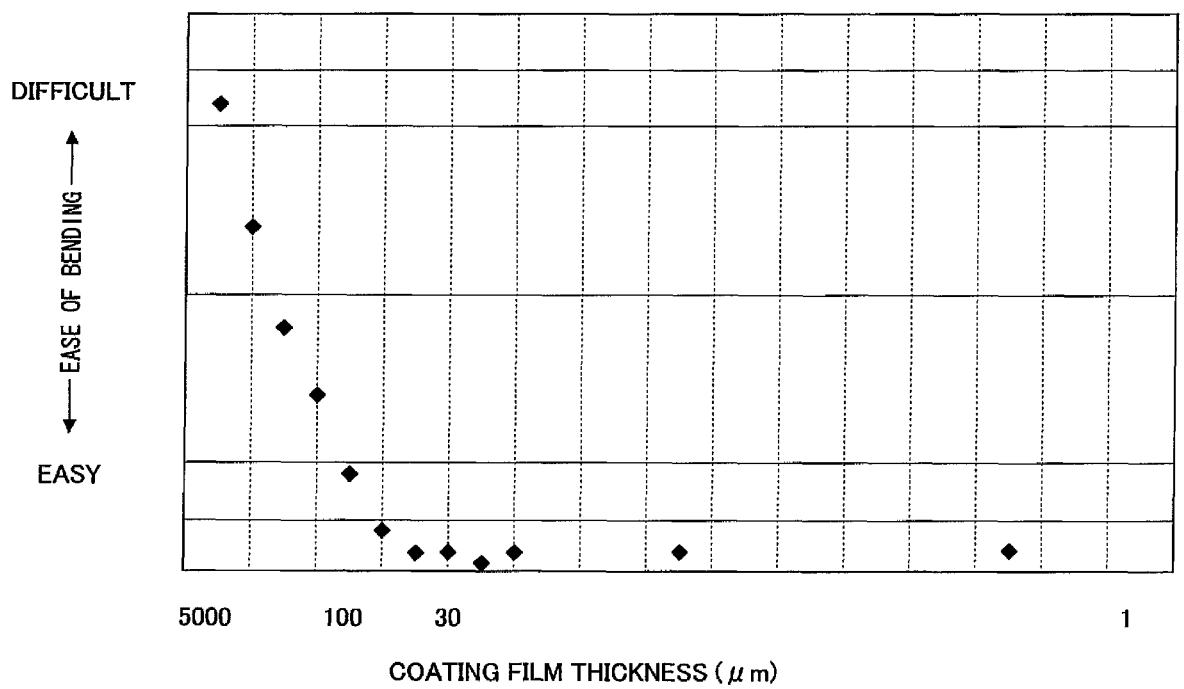
FIG. 12 shows ease of bending in relation to a thickness of the coating film.

FIG. 12 shows ease of bending in relation to the thickness of the coating film 152.

As shown in FIG. 12, as the coating film 152 becomes thicker, the waveguide film cable 113 becomes difficult to be bent and the anti-bending property is improved.

Figure 13:
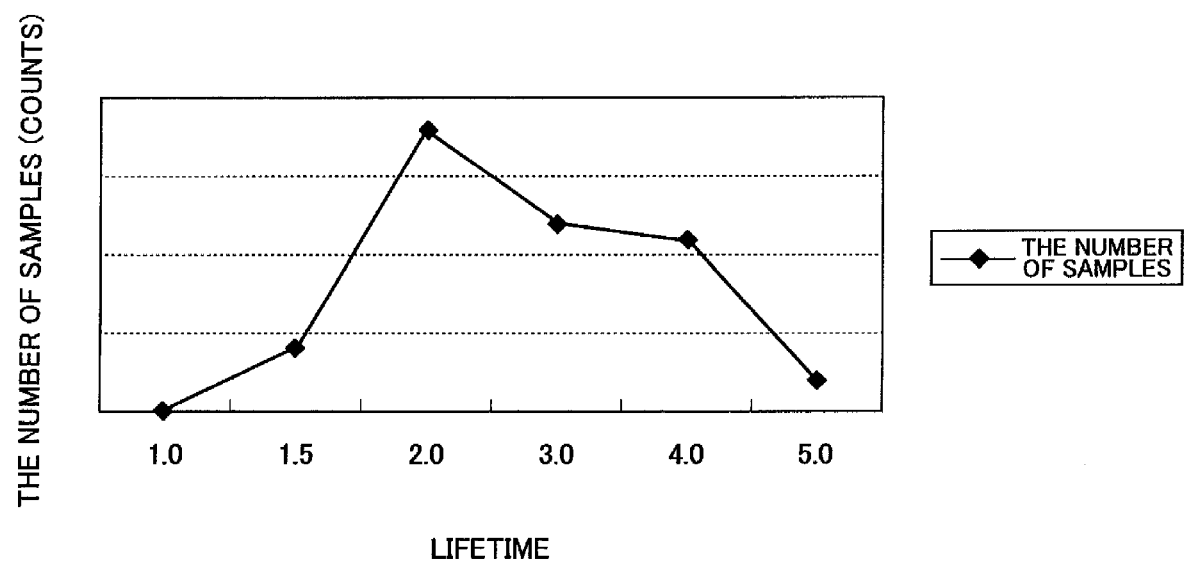
FIG. 13 shows a validation result about a lifetime of the waveguide film cable in relation to the number of times bending.

FIG. 13 shows a result of validation in an extended lifetime of the waveguide film cable in relation to the number of times bending, due to the coating film 152. In FIG. 13, the lifetime is represented as a relative value to the lifetime of the waveguide film cable having no coating film 152.

As shown, the waveguide film cable 113 having the coating film 152 has 1.5-5 times longer lifetime in relation to the number of times bending, compared to a waveguide film cable having no coating film 152.

The present application claims priority based on Japanese Patent Application No. 2005-217931, filed on Jul. 27, 2005, the entire contents of which are hereby incorporated by reference.

The invention claimed is:

1. A waveguide film cable comprising:
   a waveguide formed on a film; and
   a coating film that coats partially or entirely one of the film and the waveguide, the coating film being made of a material having a Young's modulus smaller than or equal to a Young's modulus of a material that forms one of the film and the waveguide.

2. The waveguide film cable of claim 1, wherein the Young's modulus of the coating film is $1.0 \times 10^4$ through $9.0 \times 10^9$ dynes/cm$^2$.

3. The waveguide film cable of claim 1, wherein the coating film is firmly attached to one of the film and the waveguide.

4. The waveguide film cable of claim 1, wherein the coating film is formed on one of a waveguide-formed surface, a waveguide-unformed surface, a side surface of the film, and the waveguide.

5. The waveguide film cable of claim 1, wherein the coating film has a thickness of 1 through 500 μm.

* * * * *